US010503975B2

(12) United States Patent
Campbell

(10) Patent No.: US 10,503,975 B2
(45) Date of Patent: Dec. 10, 2019

(54) MOVEMENT INTELLIGENCE USING SATELLITE IMAGERY

(71) Applicant: DigitalGlobe, Inc., Longmont, CO (US)

(72) Inventor: Ken Campbell, Longmont, CO (US)

(73) Assignee: DIGITALGLOBE, INC., Longmont, CO (US)

(*) Notice: Subject to any disclaimer, the term of this patent is extended or adjusted under 35 U.S.C. 154(b) by 0 days.

(21) Appl. No.: 16/150,177

(22) Filed: Oct. 2, 2018

(65) Prior Publication Data
US 2019/0303647 A1 Oct. 3, 2019

Related U.S. Application Data

(63) Continuation of application No. 15/241,034, filed on Aug. 18, 2016, now Pat. No. 10,089,528.

(60) Provisional application No. 62/206,827, filed on Aug. 18, 2015.

(51) Int. Cl.
G06K 9/00 (2006.01)
G06F 16/58 (2019.01)
G06F 16/56 (2019.01)
G06F 16/29 (2019.01)
G06K 9/32 (2006.01)

(52) U.S. Cl.
CPC .......... G06K 9/0063 (2013.01); G06F 16/29 (2019.01); G06F 16/56 (2019.01); G06F 16/5866 (2019.01); G06K 9/00335 (2013.01); G06K 9/00651 (2013.01); G06K 9/00785 (2013.01); G06K 9/3233 (2013.01); G06K 2009/3291 (2013.01)

(58) Field of Classification Search
CPC ...... G06F 16/5866; G06F 16/29; G06F 16/56; G06K 9/00335; G06K 9/00651; G06K 9/00785; G06K 9/3233; G06K 9/0063; G06K 2009/3291
See application file for complete search history.

(56) References Cited

U.S. PATENT DOCUMENTS

| 5,097,268 | A  | * | 3/1992  | Bauer, Jr. | G01S 7/22 342/160 |
| 7,127,085 | B2 | * | 10/2006 | Kim | G06K 9/6206 382/113 |
| 7,259,373 | B2 | * | 8/2007  | Zani | B82Y 10/00 250/309 |
| 7,298,289 | B1 | * | 11/2007 | Hoffberg | G01C 21/26 340/903 |
| 7,933,451 | B2 | * | 4/2011  | Kloer | G06K 9/6228 382/190 |
| 9,036,861 | B2 | * | 5/2015  | Chen | G06T 7/0002 382/100 |
| 9,679,227 | B2 | * | 6/2017  | Taylor | G01C 11/06 |
| 2010/0207804 | A1 | * | 8/2010 | Hayward | G01S 7/414 342/28 |

* cited by examiner

Primary Examiner — Shefali D Goradia
(74) Attorney, Agent, or Firm — Brian R. Galvin; Galvin Patent Law, LLC

(57) ABSTRACT

A system for incorporating geographical data into a map-related system, adding objects being tracked while moving within a specific geographic area and automatically analyzing their movement characteristics; wherein the tracking is done by visual means from a sky-borne platform.

6 Claims, 19 Drawing Sheets

MOVEMENT INTELLIGENCE USING SATELLITE IMAGERY

CROSS-REFERENCE TO RELATED APPLICATIONS

The present application is a continuation of U.S. patent application Ser. No. 15/241,034, titled "MOVEMENT INTELLIGENCE USING SATELLITE IMAGERY" and filed on Aug. 18, 2016, which claims the benefit of, and priority to, U.S. provisional patent application Ser. No. 62/206,827, titled "MOVEMENT INTELLIGENCE USING SATELLITE IMAGERY" and filed on Aug. 18, 2015, the entire specification of each of which is incorporated herein by reference in its entirety.

BACKGROUND OF THE INVENTION

Field of the Invention

The disclosure relates to the field of social media, and more particularly to the field of detection and tracking of moving objects on the earth's surface using satellite imagery.

Discussion of the State of the Art

Information on human settlements is crucial for a wide range of applications including emergency response, disaster risk reduction, population estimation/analysis, and urban/regional planning. Urbanization pressure generates environmental impacts, indicates population growth, and relates to risk and disaster vulnerability. For instance, the global population passed the mark of 7.0 billion in 2011 with more than half of the population living in urban areas. Between 2011 and 2050, the urban population is expected to increase by about 2.7 billion, passing from 3.6 billion in 2011 to 6.3 billion in 2050. The population growth in urban areas is projected to be concentrated in the cities and towns of the less developed countries and continents. Asia, in particular, is projected to see its urban population increase by 1.4 billion, Africa by 0.9 billion, and Latin America and the Caribbean by 0.2 billion.

Population growth is therefore becoming largely an urban phenomenon concentrated in the developing world resulting in major challenges to manage the urban development in a sustainable manner. A central issue in this respect is the availability of up-to-date information on the extent and quality of the urban settlement (e.g., the urban "build-up" or "built-up") which is largely unavailable in developing countries. For instance, cities are often growing at a pace that cannot be fully controlled by the local or regional mapping agencies. As demographic pressure increases exponentially at a global level, the ability to monitor, quantify and characterize urbanization processes around the world is becoming paramount. The information about the quality of urban development can provide precious input for understanding the vulnerability of the population living on our planet.

While satellite imagery could provide information about the world-wide built-up environment, there are few global data sets available that could be used to map the human settlements. Examples include the night-time lights of the world based on the Defense Meteorological Satellite Program-Operational Linescan System (DMSP-OLS) sensor, Moderate Resolution Imaging Spectroradiometer (MODIS) based land use/land cover classifications, and global population data sets like LANDSCAN™ or the gridded population of the world (GPW). While the aforementioned data sets are useful for global analysis, the data sets have the tendency to underrepresent small, scattered rural settlements due to the low spatial resolution of the data sets between, for instance, 500 and 2,000 m. Furthermore, the data sets represent single snap-shots in time that do not allow for regular monitoring. Still further, if the data sets are updated (e.g., the LANDSCAN™ data set), they are not directly comparable due to changing input sources.

Image analysis has been an important field of technology at least since the period of World War 2, when extensive use of image analysis, photogrammetry, and related technologies was used in conjunction with aerial photography for intelligence and bombing damage assessment purposes (among others). However, the extent of the use of image analysis (particularly image analysis of remotely-sensed images), particularly for identifying or locating targets of interest, has always been limited by the need for highly-trained, specialized image analysts or interpreters. The need for specialized (and expensive) skills has limited the use of image analysis to a correspondingly limited range of applications (notably military, homeland defense, and law enforcement).

The market for image analysis has also historically been limited by the high cost of obtaining images to analyze. In the military arena, the benefits were sufficiently apparent that large numbers of military reconnaissance flights were made over regions of interest since World War 2. But the cost of such flights virtually totally excluded all commercial applications of image analysis. Starting in the 1970s with the Landsat satellite, this began to change as low resolution satellite images became publicly available. A series of new satellites has opened up progressively more applications as the resolution, spectral coverage, geographic coverage, and cost per image have all continuously improved; accordingly, a significant market in commercial remote sensing imagery has emerged. But even this market has been limited from achieving its full potential because of the still-present requirement for expensive, scarce image analysis talent. Some progress has been made in automated image analysis technologies, but for a vast range of current and potential applications, large scale image analysis (such as would be needed when analyzing satellite images of a large region) remains too expensive and too supply-constrained to use.

One common type of image analysis problem is the "search and locate" problem. In this problem, what is needed is to find and to precisely locate one or more targets of interest. For example, in search and rescue, it may be important to find a missing plane using satellite imagery. Another example is the finding and precise location of warships, tanks, or other military targets of interest. Less common but promising applications include such things as assessing hurricane damage by finding and locating damaged buildings and infrastructure, finding and locating potentially important archeological sites (for instance, by identifying possible ruins in deserts), and assessing the scope of a refugee problem by for example counting tents in an area of interest.

Recently, the notion of "crowdsourcing" (using very large numbers of people, each doing a small part of a large task, to accomplish large of complex tasks quickly at extremely low cost) has emerged, and a number of crowdsourcing platforms have been implemented. Some of these address topics of broad general interest (for example, WIKIPEDIA™), and some are more specialized (for example, GALAXYZOO™, where users are shown images of objects from the Hubble Space Telescope and asked to decide if the object shown is a galaxy and, if so, what kind of galaxy it is). Most crowdsourcing platforms to date rely on volunteers to perform the work, although some (such as Amazon's Mechanical Turk) are commercial in nature and pay for crowdsourced work. There have been two general approaches to managing crowdsourced work. In the first, a large, complex or repetitive task is broken up into many subtasks, with each subtask being given to a single worker; as workers complete the subtasks, the results are rolled up and the overall task is completed at low cost. Generally, various means are used to measure the quality or value of the tasks performed by each participant, so that over time a reputation or quality score can be assigned to each participant; in some cases, work is assigned based at least in part on these reputation or quality scores. The work distribution and quality measurement approach is used, for example, by Amazon's Mechanical Turk platform. A second common approach to crowdsourcing is to use an essentially democratic process to have a crowd decide a difficult question. The process is referred to as "democratic" because each participant simply votes on what the participants believes the answer to be (this is helpful for classification problems such as that described above for GALAXYZOO™).

While aspects of both of these problems are relevant to the broad search and locate application domain, neither of them is sufficient. Consider the refugee assessment problem just described. The work distribution approach can clearly be used to divide up the task for distribution to many participants (typically volunteers). Similarly, the democratic approach could be used by the platform to decide whether something is or is not a tent, based on the number of votes each classification of a specific object received. But neither of these dominant approaches is satisfactory, and the two together are not satisfactory either, for the search and locate problem. It is not enough to divide and conquer, because in searching an image for a specific object considerable ambiguity will be present, and if each image segment is only viewed by a single person, there would be a high likelihood of missed targets (and indeed of false positives). If multiple participants are shown the same image and a vote is taken to decide if a target of interest is present, the outcome is better. but even in this case there are problems. Consider again the refugee problem—if there are in fact ten tents in a given field of view (image segment), various participants might report anywhere from three to twelve tents in the segment. A simple average of these counts could be taken, but would likely be inaccurate. But the "search and locate" problem also requires that the location of each tent be identified (at least implicitly—it is not so important in this particular problem that the exact location of each tent is known, but it is important to use locations to resolve count ambiguities; in most search and locate problems, though, the location aspect is a key output).

What is needed, is a system and method to allow to aggregate and track over time movement, locations and participation in both virtual and real world groups and associations, as well as obtaining a sentiment reading by grouping social media and other communication content into categories and visualizing these in geographical terms.

SUMMARY OF THE INVENTION

Accordingly, the inventor has conceived, and reduced to practice, in a preferred embodiment of the invention, a platform for crowdsourcing the analysis of images, and particularly for analysis of aerial or satellite images to geolocate one or more targets of interest, or to identify objects or their types.

According to a preferred embodiment of the invention, a system for movement intelligence using satellite imagery, comprising a geospatial data analytics platform module comprising at least a plurality of software programming instructions stored in a memory and operating on a processor of a computing device, configured to operate a plurality of internal processing software modules, the internal processing software modules comprising at least one of each of: an analytics module configured to receive at least raster data from a plurality of data sources, and configured to analyze at least a portion of the raster and vector data to identify movement patterns in the data; an internal services module configured to handle data processing to and from a plurality of internally-maintained data sources; and an external services module configured to handle data processing to and from a plurality of external data sources, is disclosed.

According to another preferred embodiment of the invention, a method for movement intelligence using satellite imagery, comprising the steps of applying, using an analytics module configured to receive at least raster data from a plurality of data sources, and configured to analyze at least a portion of the raster and vector data to identify movement patterns in the data, a Gaussian distribution error model to a plurality of raster and vector data; computing travel frequency in raster data from the Gaussian error model; vectorizing high-density travel regions; and fusing the raster and vector data to produce an estimation for road conflation, is disclosed.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
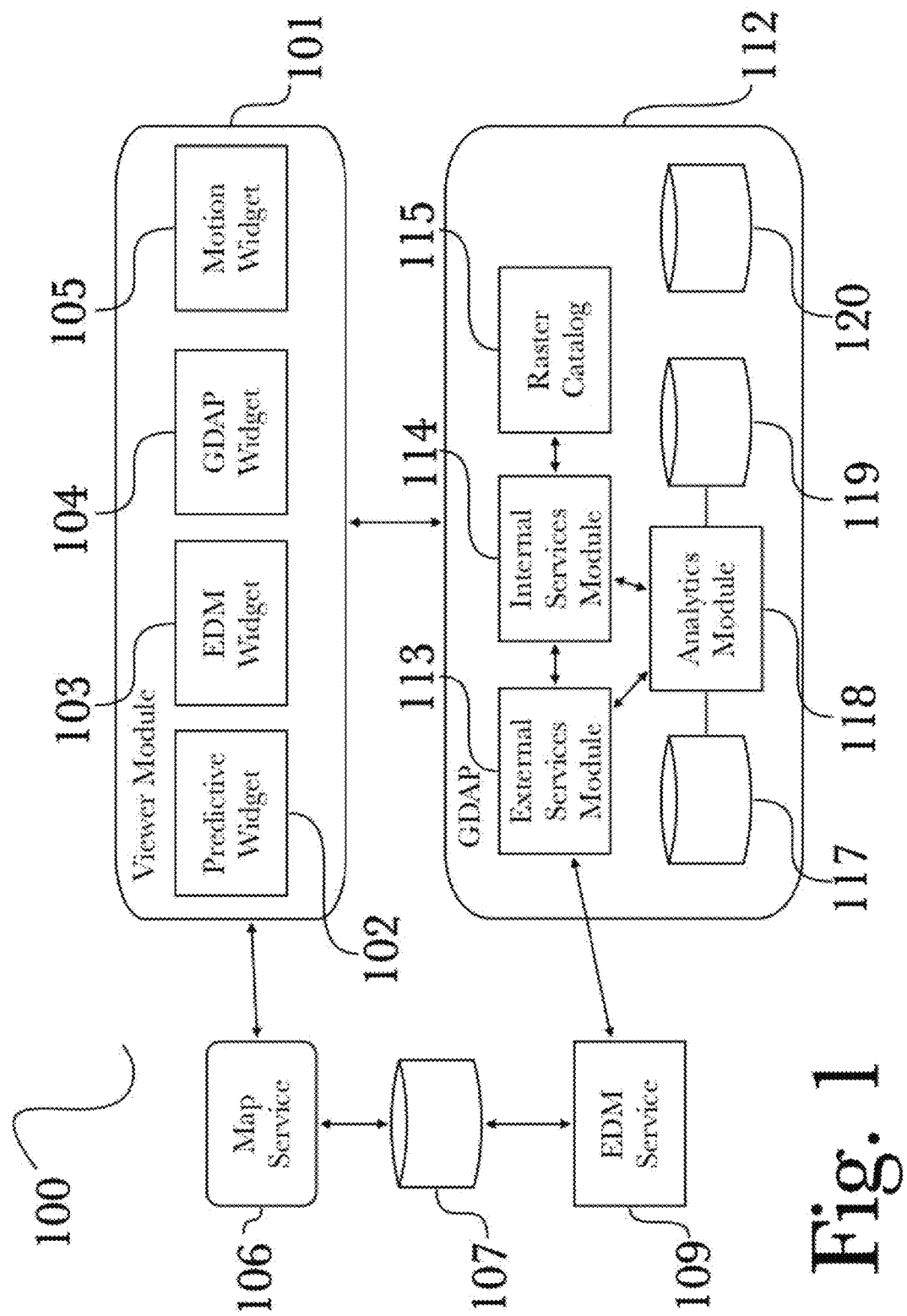
FIG. 1 shows an exemplary overview of geospatial data analytics platform (GDAP) architecture, according to a preferred embodiment of the system and method disclosed herein.

The inventor has conceived, and reduced to practice, in a preferred embodiment of the invention, a platform for crowdsourcing the analysis of images, and particularly for analysis of aerial or satellite images to geolocate one or more targets of interest, or to identify objects or their types.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

The embodiments disclosed herein enable incorporation of geographical data into a map-related system, adding tracked objects within a specific area and analyzing their type of movement. The system may track objects visually from a tracking means in the sky, such as a drone, a satellite, a blimp, a high-altitude aircraft, or other, similar vehicle, using either high-resolution or infra-red video. Furthermore, the system can then analyze characteristics of the tracked object(s), such as speed and motion, to determine the nature of the objects, such as, for example, whether a car, a train, a motor bike, a motorcycle, a bicycle, or a pedestrian, or in some cases other types of movable objects such as drones, UAVs, robots, boats and other forms of movable objects.

For example, the system can have features to support complex queries of tracking and tracking event data for complicated, composite events. It can help find tracks by event, by time within the area of interest (AOI), near a point of interest (POI), or relative to features. Also, tracking may be done by GPS or other mobile device techniques, including but not limited to tower or beacon triangulation, inertia navigation, radio compass or any other suitable method.

The system further enables discovery of tracked movement in relation to an area. It can highlight where a track started or where a track went; and what other tracks started or arrived at the same location. Once an object has been identified, the system can create a trail or track that in this context shall mean a trail or track that shows the actual movement of the object of interest. Also if the track suddenly stops or disappears, an "area of evasion" can be determined to show that the object has disappeared or has evaded the tracking means. For example, an object may disappear by blocking the antenna of the GPS tracking device or by melting into the background and being impossible to track visually. The trail or track may change its appearance to indicate additional information. Such changes could include, for example, variations in color, hatching or dash patterns, width, etc. as well as layering, wherein only certain trails of interest are on a visible layer to unclutter the view. Additional information may include, for example, proximity to AOI, person, or object identifier, speed at which the item is moving, etc.

The system and method disclosed herein may be used, for example, for transit time analysis based on real time or historic traffic flows. While such tracking and analysis is similar to what is currently done in, for example, Google maps, it can be done by using visual means additionally, or in lieu of the typical mobile device tracking. This approach also enables choke point analysis, where there is a high concentration of traffic, and it enables further research into details.

FIG. 1 shows an exemplary overview of geospatial data analytics platform (GDAP) architecture 100, according to a preferred embodiment of the system and method disclosed herein. GDAP, which is a geospatial big data platform with vector and raster analytics, can combine vector and raster data into one tool set on one platform, so users can examine and run analytics on all the data, without having to procure the data before each analytic session. GDAP module 112 contains various internal modules, plus access to vector database 117 and raster database 119. Analytics module 118 can combine the two databases. Other modules include an external services module 113 and an internal services module 114 to manage internal data processing. Raster catalog 115 shows available raster data, such as, typically, aerial or satellite images, in database 119. Database 120, which could be an SQL database or any other, similar type of database, contains motion intelligence data as discussed above and throughout. Module 112 can interface with viewer module 101, which contains various analytic widgets, including predictive analytics widget 102; elevation data management (EDM) analytics widgets 103, offering vector watershed analysis and terrain maps; GDAP analytics widget 104; and motion analytics widget 105, discussed earlier and throughout. All the tools and functions of modules 101 and 112 can be integrated with EDM service 109. Additionally, external map service 106 includes general maps and other foundation data 107 from various external sources.

Figure 2:
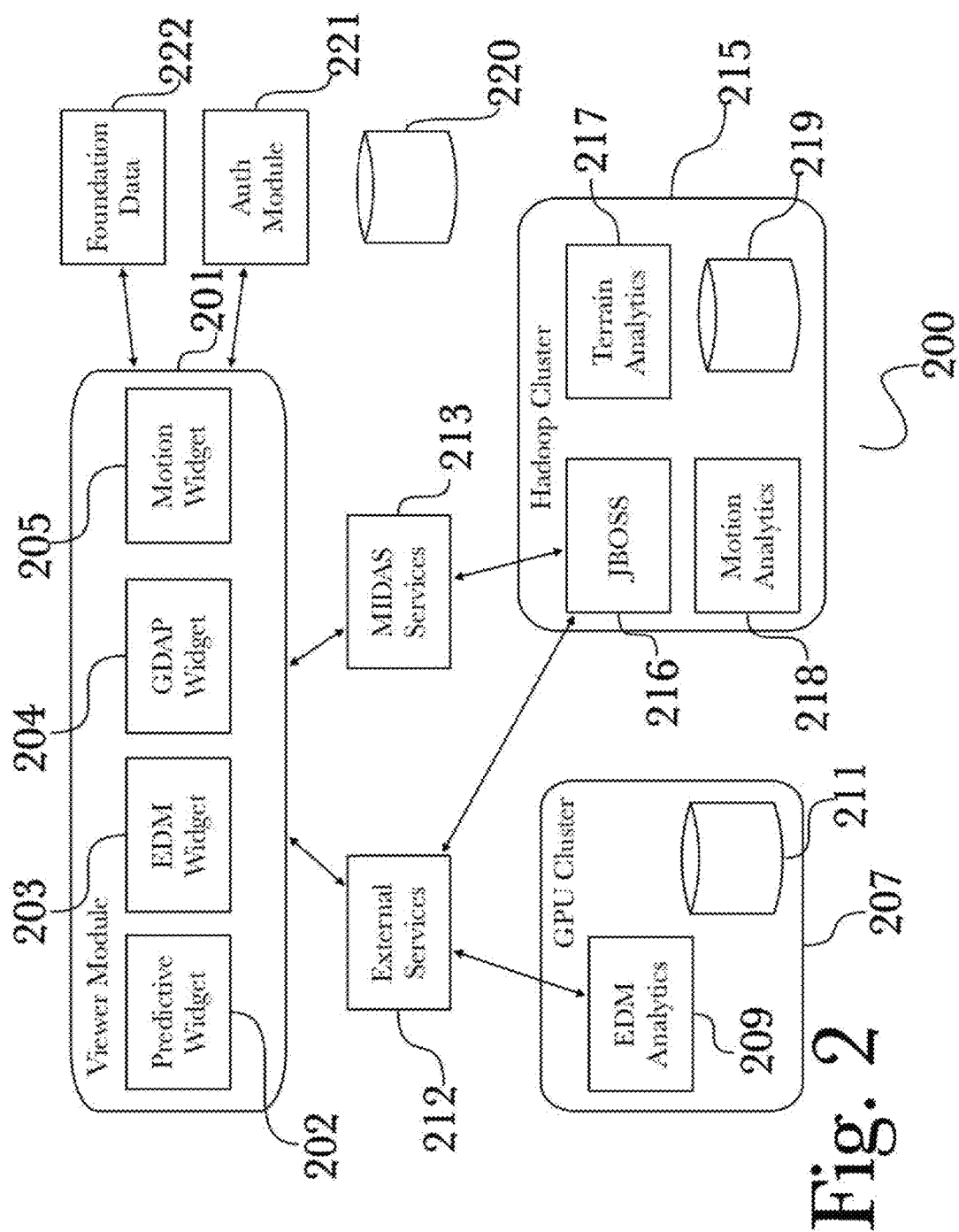
FIG. 2 shows an exemplary view of enhanced GDAP system architecture, according to a preferred embodiment of the system and method disclosed herein.

FIG. 2 shows an exemplary view of enhanced GDAP system architecture 200, according to a preferred embodiment of the system and method disclosed herein. GPU cluster 207 supports external services. Cluster 207 also does elevation data analytics 209 and holds the motion event tracks database 211, as discussed previously and throughout. Enhanced GDAP internal data services 213 is supported by a new Hadoop cluster dedicated to managing all the databases inside the Hadoop HDFS system, including the data for the terrain analytics system 217, motion analytics system 218, and pyramid surfaces factors elevation data analytics results of other processes. All internal data services may be concentrated in Hadoop cluster 215 and managed by JBOSS 216, which interfaces with GDAP internal MIDAS services 213 and GDAP external services 212. Module 212 interfaces with enhanced viewer system 201 in which widgets 202, 203, 204, and 205 are all available for a user, as discussed above in the description of module 101 in FIG. 1. The tool system of module 201 can also interface with external map data services and foundation data 222, as well as user authentication module 221. Key data is stored in separate secure storage area 220 that uses a scalable distributed key/value storage system such as ACCUMULO™ to store the data with cell-level encryption.

Figure 3:
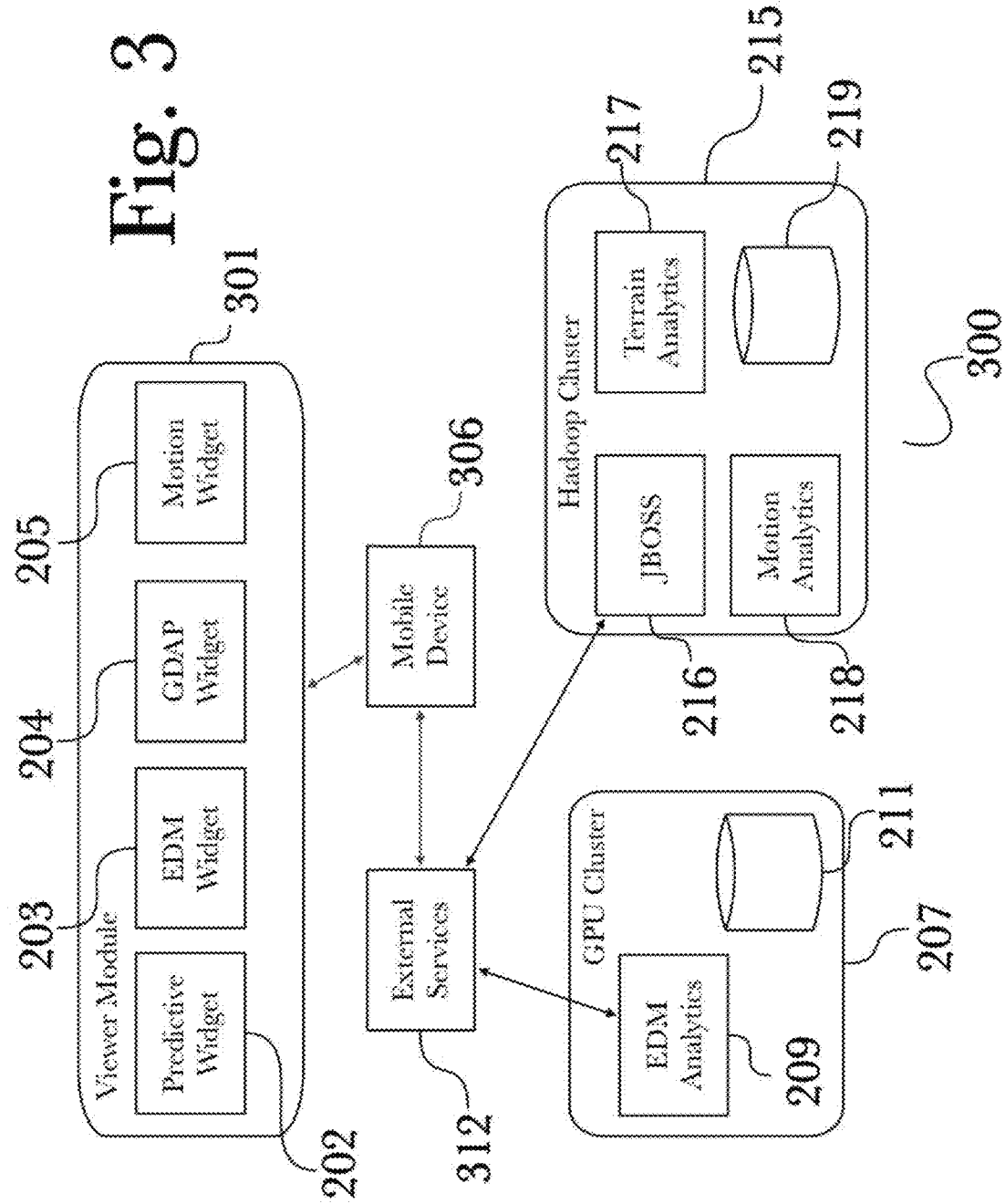
FIG. 3 shows an exemplary view of enhanced system architecture, according to a preferred embodiment of the system and method disclosed herein, wherein the GDAP external services has a mobile device service that enables a user of mobile device to run a viewer module, with similar functionality to a full display version of the viewer for a desktop computer, but with a simplified interface.

FIG. 3 shows an exemplary view of enhanced system architecture 300, according to a preferred embodiment of the system and method disclosed herein, wherein the GDAP external services 312 has a mobile device service that enables a user of mobile device 306 to run a viewer module 301, with similar functionality to a full display version of the viewer for a desktop computer, but with a simplified interface. In some cases, an internal user running the viewing software of module 301 would be able to send a preconfigured profile to a mobile device user so the mobile device user doesn't have to go through the usual configuration steps to view some data, which he may need urgently. In other cases, the device user may assemble a profile or modify an existing profile to suit his current, specific needs. This approach offers a single view for all the data aggregated and combined from all the various sources across time and geography.

Figure 4:
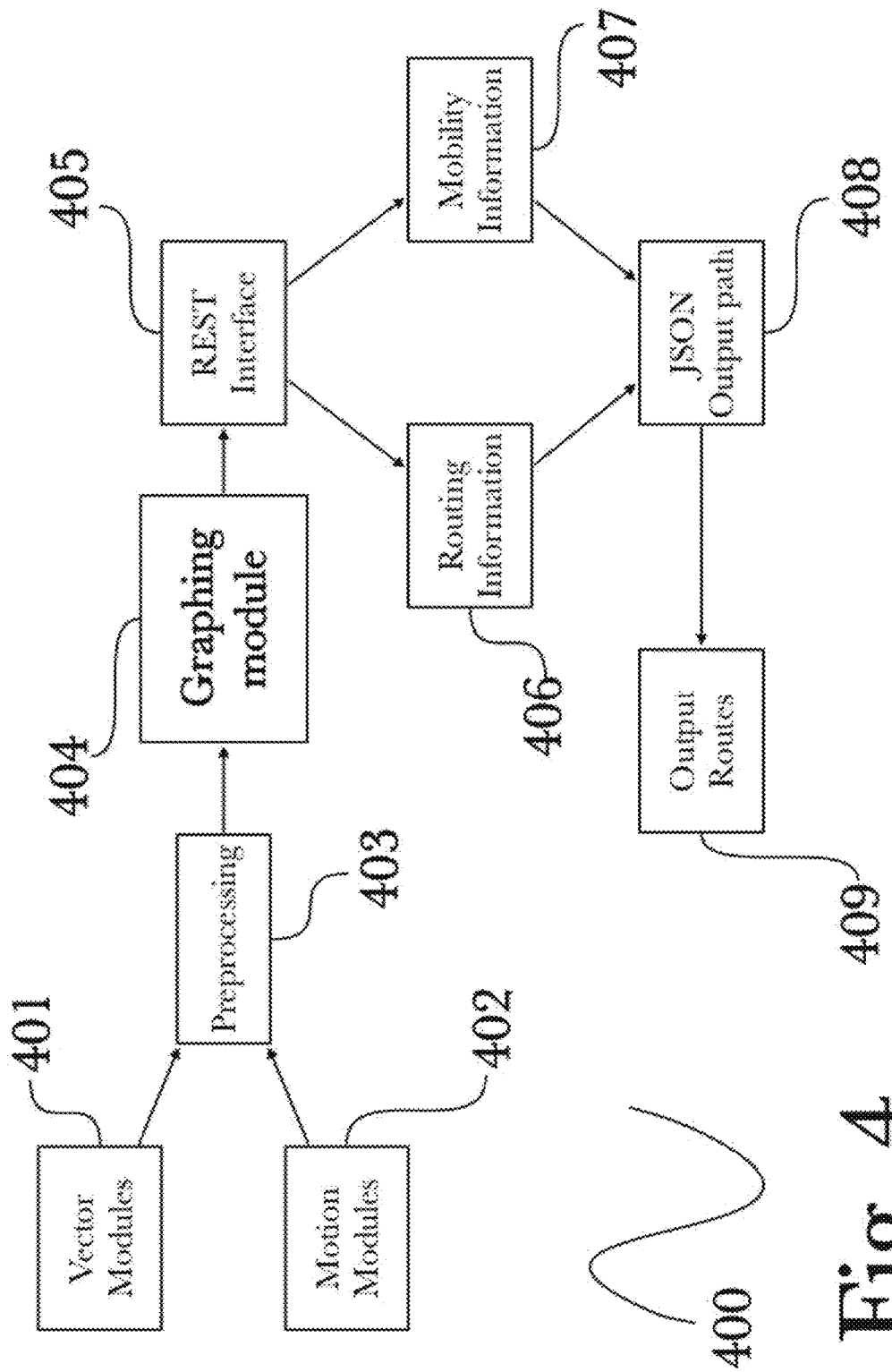
FIG. 4 shows an exemplary view of a vector data flow system, according to a preferred embodiment of the system and method disclosed herein, where the different vector data are processed in modules and motion data are processed in modules.

FIG. 4 shows an exemplary view of a vector data flow system 400, according to a preferred embodiment of the system and method disclosed herein, where the different vector data are processed in a plurality of vector modules 401 and motion data are processed in a plurality of motion modules 402. They then flow through a plurality of preprocessing stages 403, into graphing module 404. Graphing module 404 then uses REST interface 405 to deliver routing information 406 and mobility information 407, where it can be called up with a JSON output path 408 to show a variety of routes 409, based, for example, on traffic congestion and real-time data.

Figure 5:
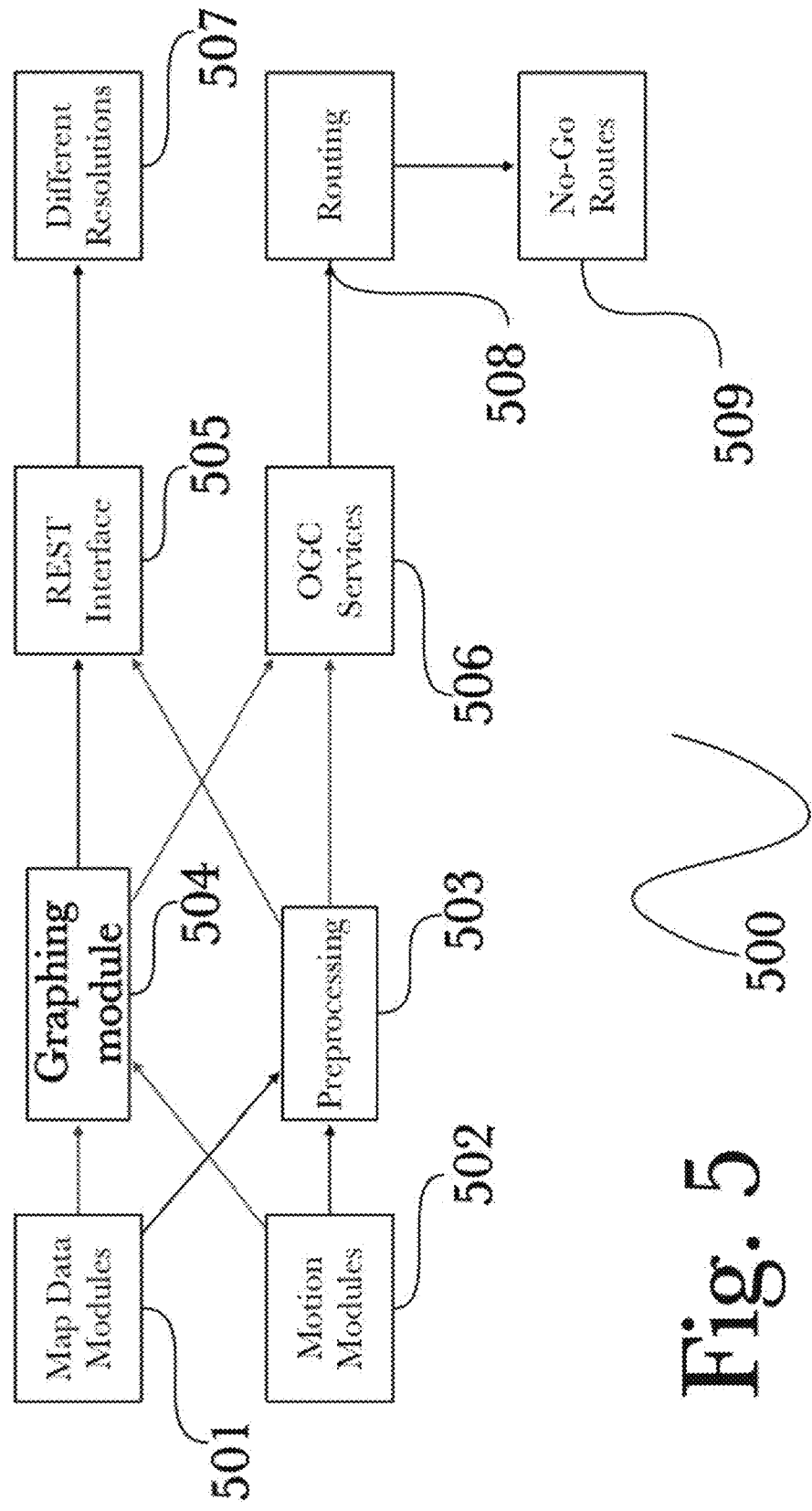
FIG. 5 shows an exemplary view of a red/green terrain analysis system, according to a preferred embodiment of the system and method disclosed herein, for data flow.

FIG. 5 shows an exemplary view of a red/green terrain analysis system 500, according to a preferred embodiment of the system and method disclosed herein, for data flow. In this example, and typically, red indicates "unfriendly," i.e., enemy-held, terrain, while green indicates "friendly" terrain. In other cases, other colors may be used to indicate defined characteristics. Map data input modules 501 and motion data modules 502 are processed into the graphing module 504, but in parallel steps preprocessing modules 503 bring in metadata into the main processing through the REST interface 505 and the OGC services 506. This approach enables separation of the data into red/green terrain and offers the results in different resolutions 507, as well as routing 508, with the option of fastest route, shortcut route, and no-go area routing 509.

Figure 6:
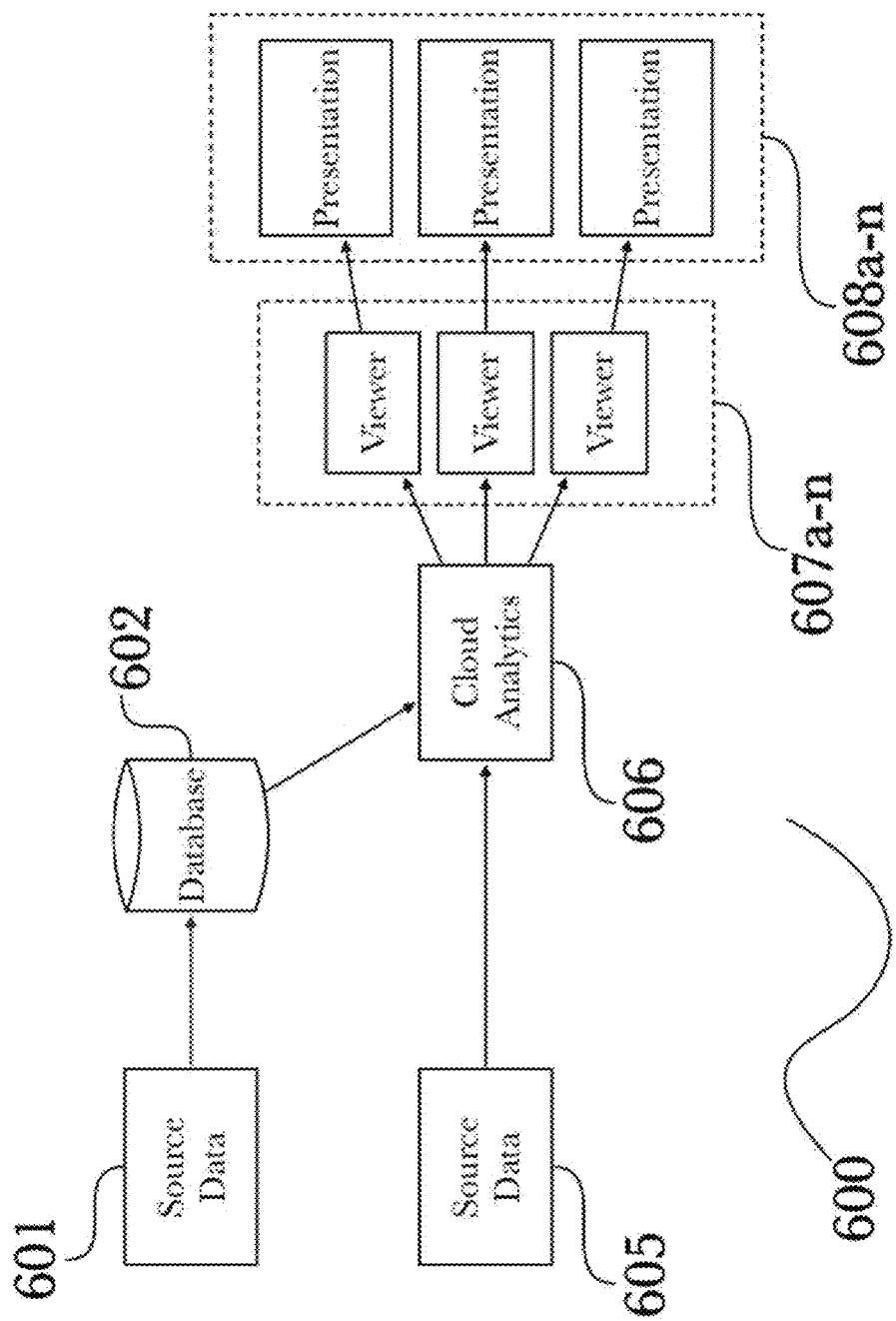
FIG. 6 shows a more global overview of the system architecture, according to a preferred embodiment of the system and method disclosed herein.

FIG. 6 shows a more global overview 600 of the system architecture, according to a preferred embodiment of the system and method disclosed herein. Source 601 is processed into database 602, while source 605 goes directly into cloud-based analytics 606. Using cloud-based analytics 606 the results are pulled up in real time and delivered into the different usage cases for different types of viewing 607*a-n* and then to presentations 608*a-n*.

Figure 7:
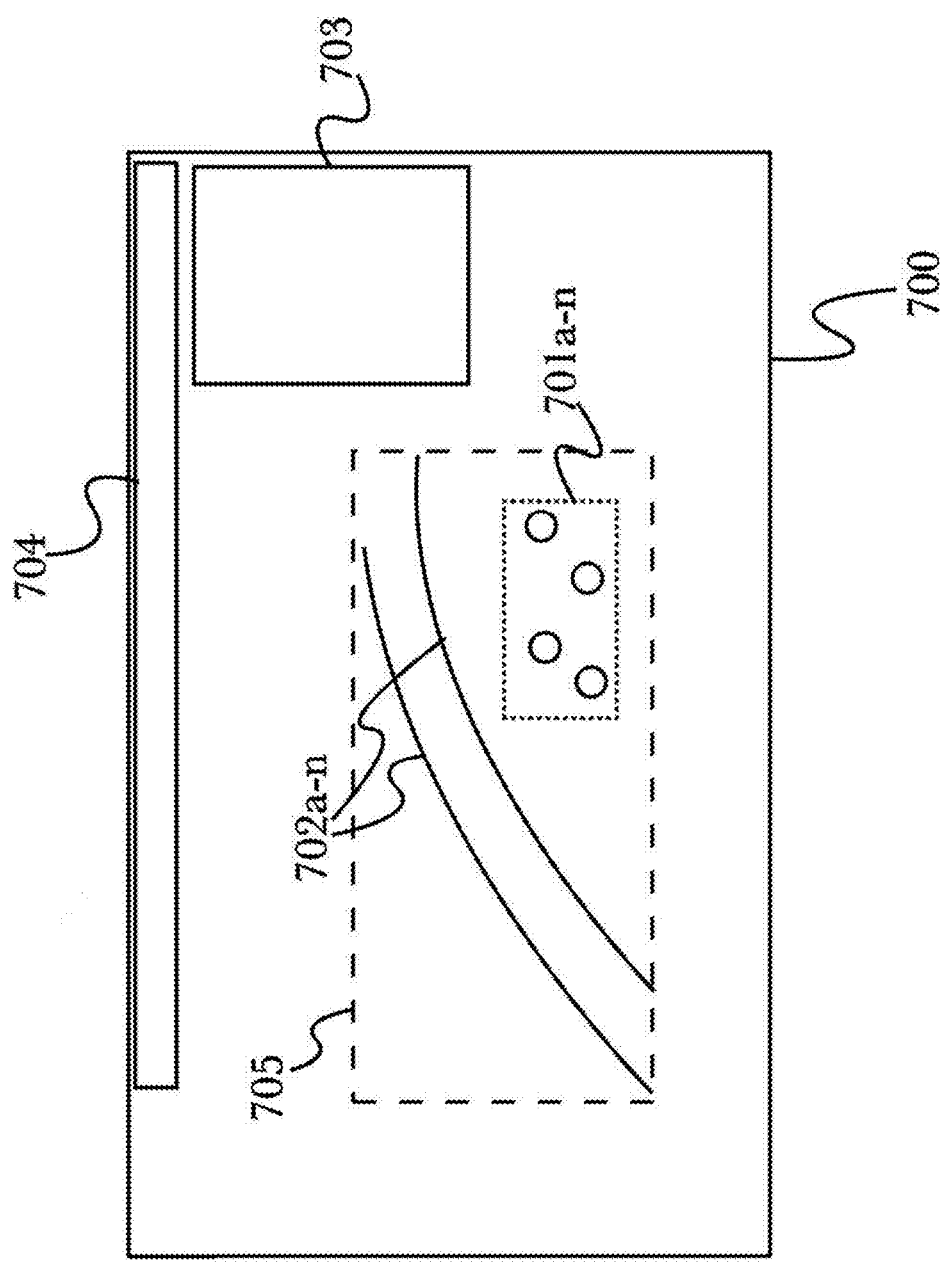
FIG. 7 shows a satellite image, containing a set of tracks, points of interest (red dots with black centers and black outlines), as well as a tool bar with system management tools such as, for example, zoom in, zoom out, GPS coordinates, geographic identifiers such as town name, or other operational tags.

FIG. 7 shows satellite image 700, containing a set of tracks 702*a-n*, points of interest (red dots with black centers and black outlines) 701*a-n*, as well as a tool bar 704 that may display a variety of system management tools such as (for example, including but not limited to) zoom in, zoom out, GPS coordinates, geographic identifiers such as town name, or other operational tags. Toolbar 704 has a pen tool so a user can highlight and mark an area. Window 703 may display additional information about a selected area 705. Thus a user can execute various operations, such as, for example, combining the beginning and the end of two connected tracks.

Figure 8:
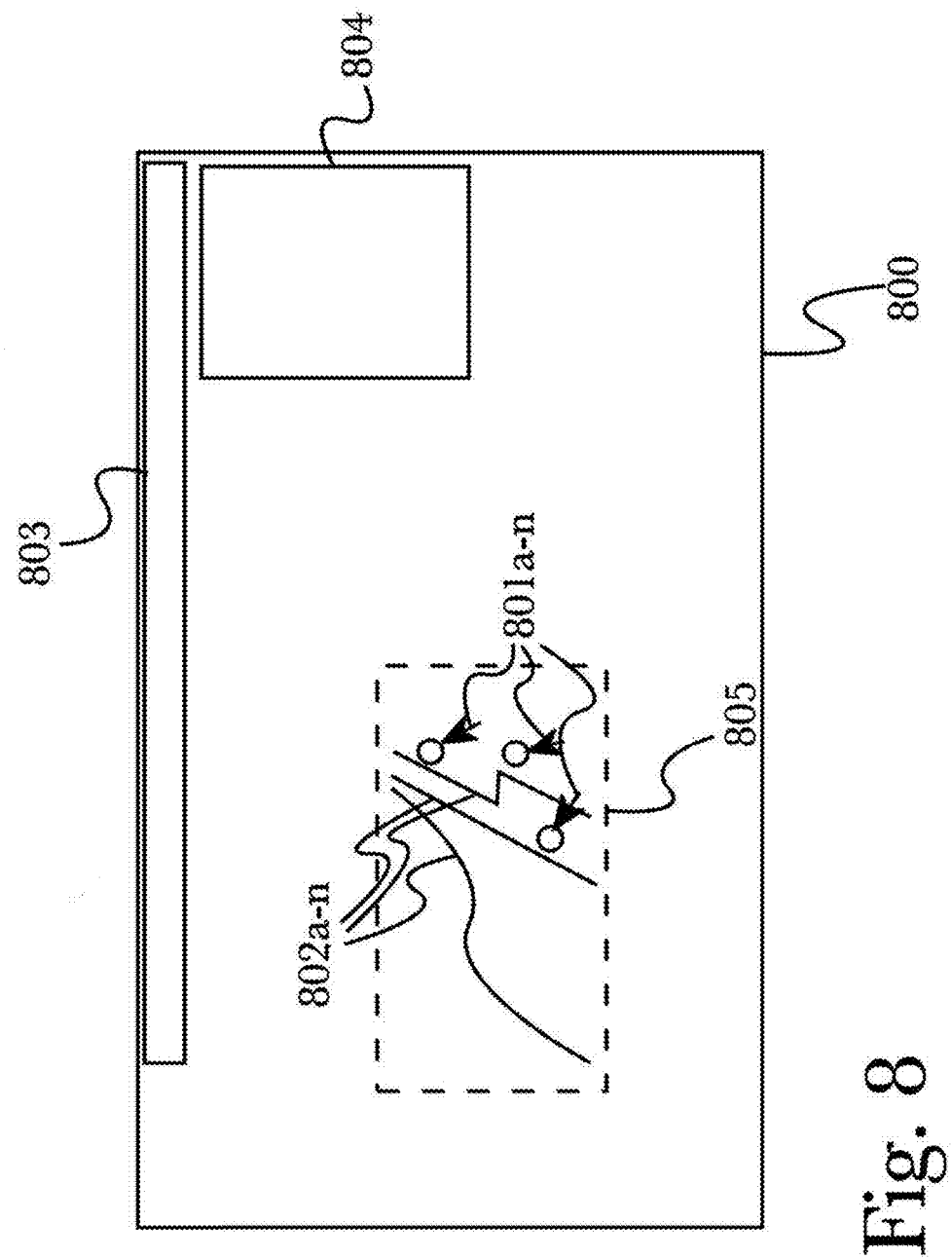
FIG. 8 shows tracks overlaid on a satellite image.

FIG. 8 shows tracks 802*a-n* overlaid on satellite image 800. Tracks 802*a-n* may pass by certain areas of interest (circles on screen display) that may be indicated by arrows 801*a-n*. Also shown are toolbar 803 and information window 804 pertaining to a selected area 805, each of which is described above with reference to FIG. 7.

Figure 9A:
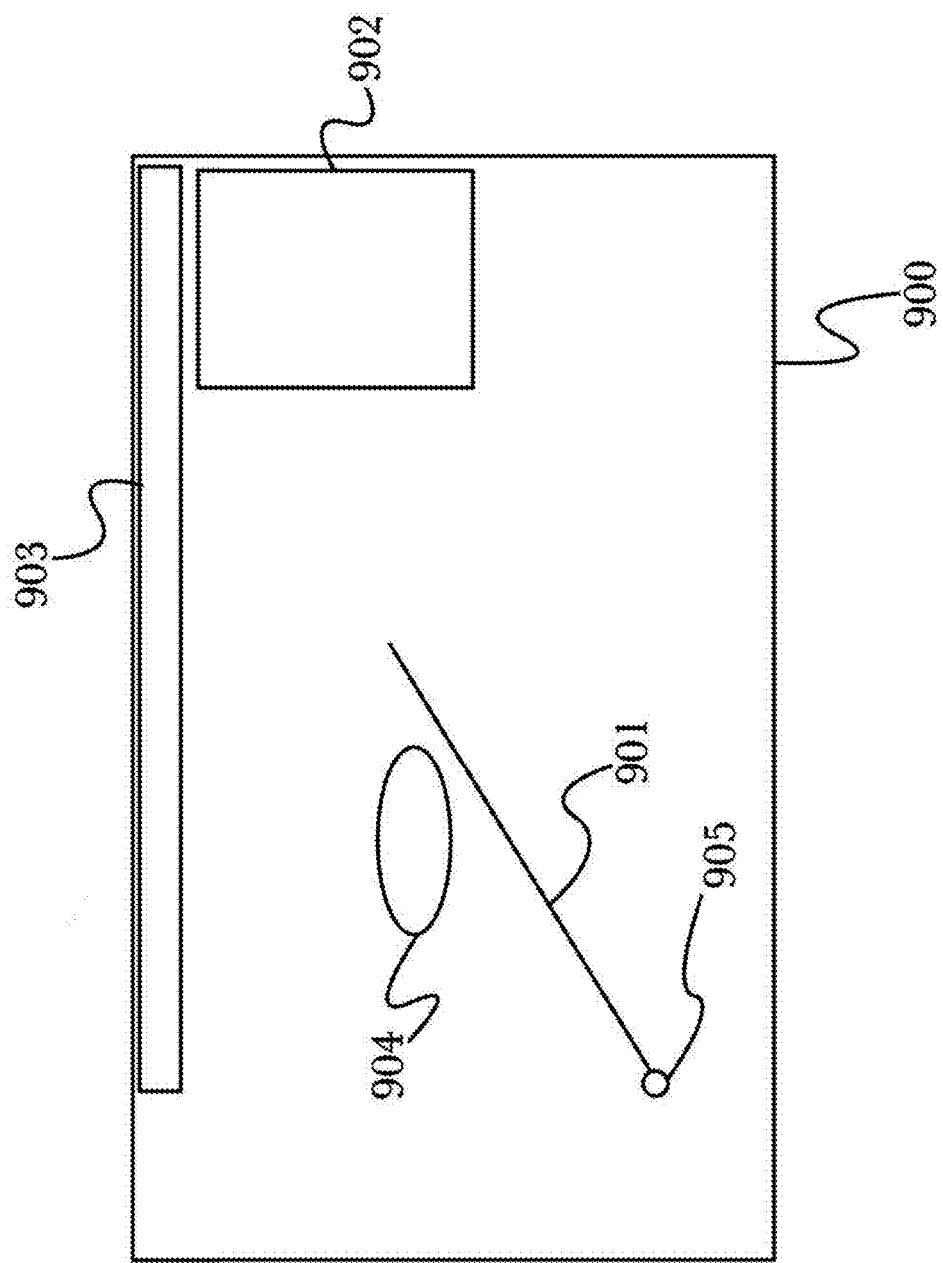
FIG. 9A shows an object entering a satellite image on a track.

FIG. 9A shows an object 905 entering satellite image 900 on track 901. In addition to the track, there could be (for example) color, width, dashed-line, or other visual styling or indications of a trail or change of color to indicate the speed at which the object is traveling. The tracked object 905 may be moving toward an area of interest 904. Also shown are toolbar 903 and information window 902, again as described previously with reference to FIG. 7.

Figure 9B:
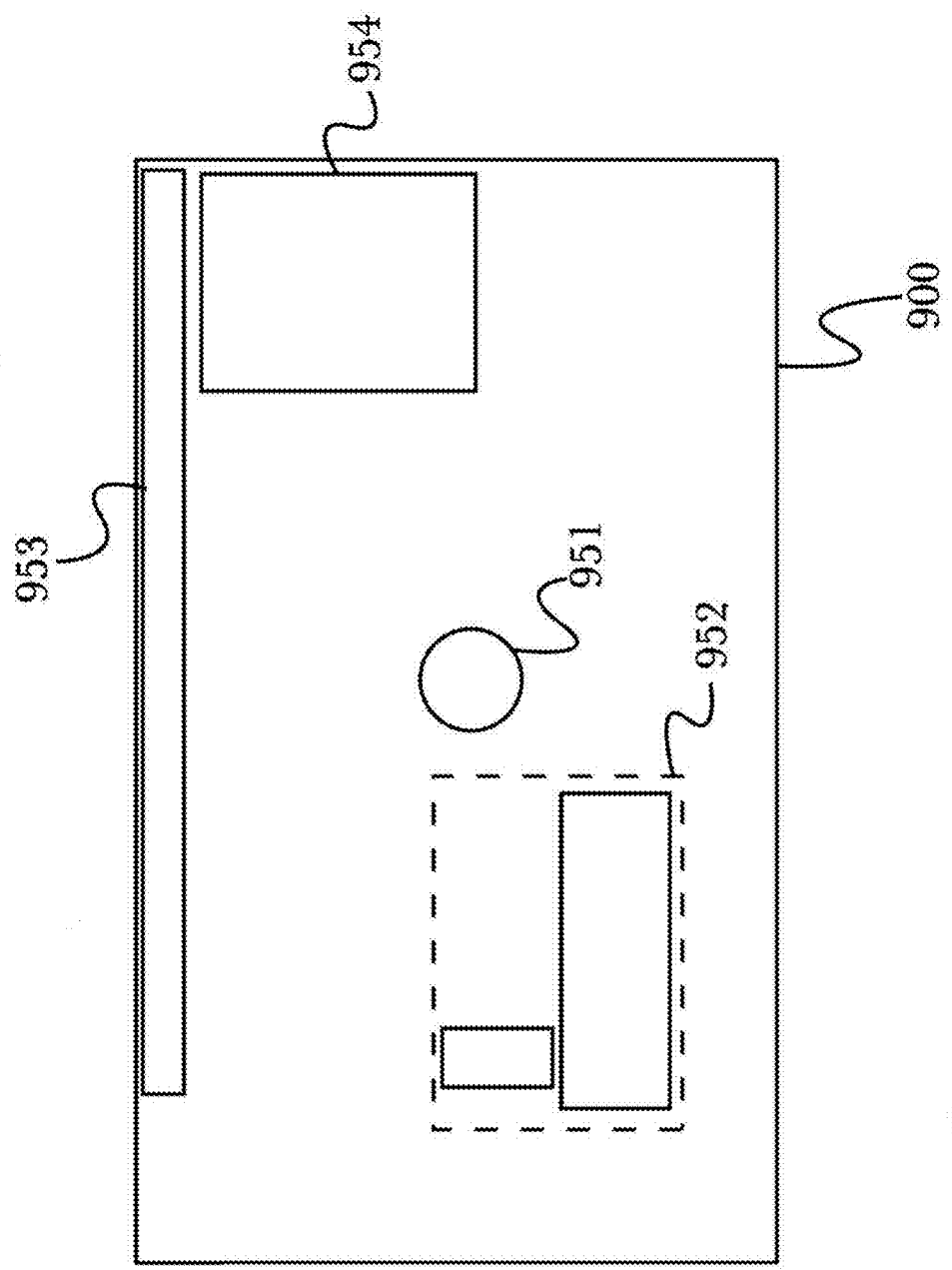
FIG. 9B shows a shaded circle on a satellite image indicating where a tracked object disappeared.

In FIG. 9B a circle 951 or other shape on satellite image 950 may indicate a selected region where a tracked object disappeared. Other nearby objects of interest may be shown such as, for example, a building with parking lot 952, as indicated by a shaded square. Also shown are toolbar 953 and information window 954, again as described previously with reference to FIG. 7.

Figure 10:
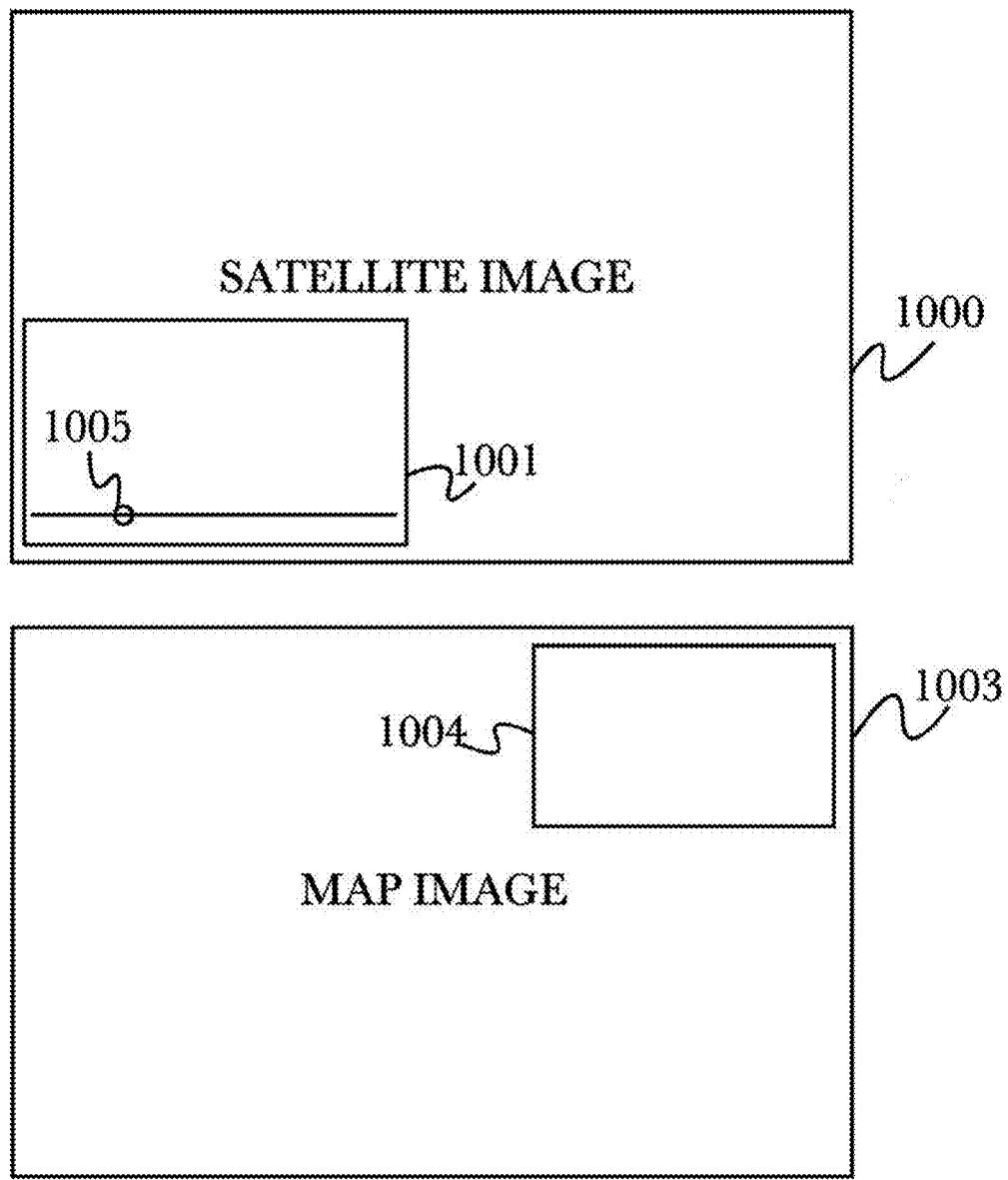
FIG. 10 shows an exemplary overview of a map area with a matching satellite image.

FIG. 10 shows an exemplary overview of a map area 1003 with a matching satellite image 1000. Inset into map 1003 is a detailed section 1004, which roughly represents the area of satellite image 1000. Overlaid on image 1000 is a control window 1001, which contains slider 1005. This slider may be used to enable a user to display changes in traffic flow according to (for example) the time of day or the week, or other criteria. Additional interactive control elements may be presented in window 1001 to enable a user to select the day of the week and other operations, or to provide specific controls for features such as holidays.

Figure 11:
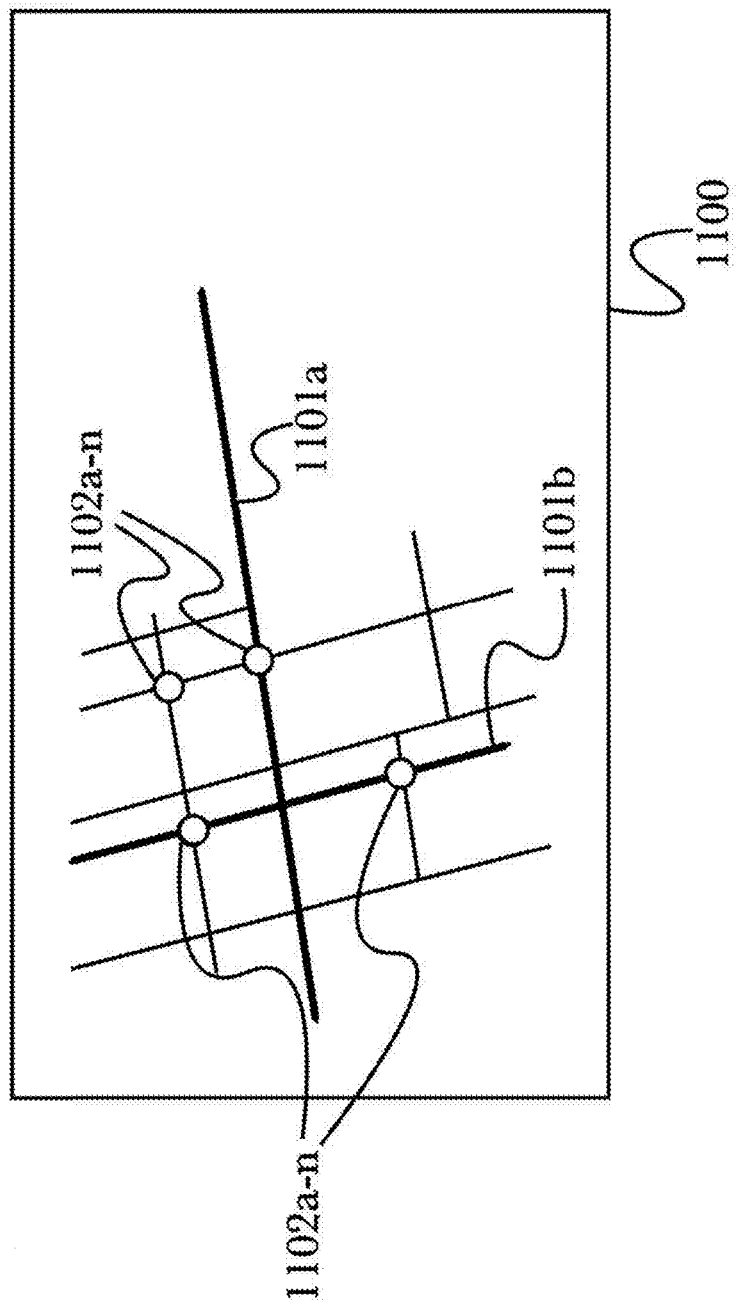
FIG. 11 shows an exemplary approach used to perform choke point analysis, according to an embodiment of the system and method disclosed herein.

FIG. 11 shows an exemplary approach used to perform choke point analysis, according to an exemplary embodiment of the system and method disclosed herein. Choke points typically occur when several traffic routes end up in an area with lots of points of interest, such as, for example, restaurants, bars, theaters, sports arena, etc. By mapping major traffic flows 1101*a* and 1101*b*, choke points 1102*a-n* and points of interest 1103*a-n* on satellite image 1100, it becomes apparent that around those POIs there are, on a regular basis, traffic jams. Choke point mapping according to the embodiment may be used to help manage traffic better or for security purposes.

Figure 12:
FIG. 12 shows an exemplary diagram of an annotated satellite image of a town, in this case Fredericksburg, W. Va., according to an embodiment of the system and method disclosed herein.

FIG. 12 shows an exemplary diagram of an annotated satellite image 1200 of a town, in this case Fredericksburg, Va., according to an exemplary embodiment of the system and method disclosed herein. Data tracks may be shown and color-coded with distinctions made according to tracked speed and other factors. Accordingly, motor vehicle tracks may (for example) be shown in blue while pedestrian tracks, determined by speed, randomness of movement, and departure from roads, may be shown in red. Further according to this example, tracks of other unknown, uncategorized vehicles, such as, for example, bicycles, motorcycles, etc., may be shown in yellow. This exemplary figure is presented simply for the purpose of illustrating how such data may be presented to a user visually.

Figure 13:
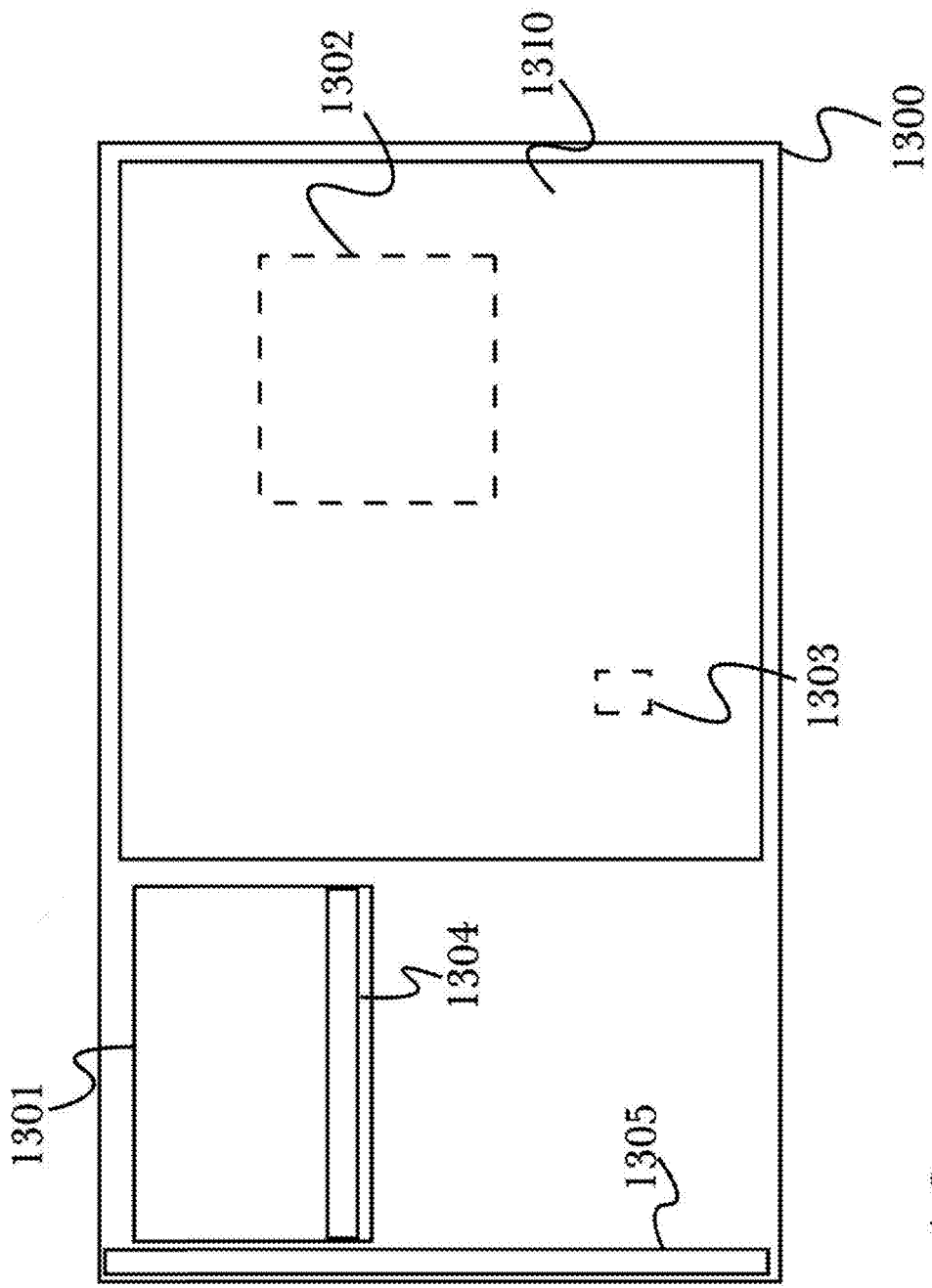
FIG. 13 shows an overview of an exemplary program screen, according to an embodiment of the system and method disclosed herein.

FIG. 13 shows an overview of an exemplary program screen 1300, according to an exemplary embodiment of the system and method disclosed herein. A tool window 1301 has been folded out from toolbox 1305. In window 1301 a slider 1304 can be used to present and interact with visualizations of traffic flow in a selected area 1303 of a map or satellite image view 1310, which may be shown in an additional zoomed-in view box 1302 if desired.

Figure 14:
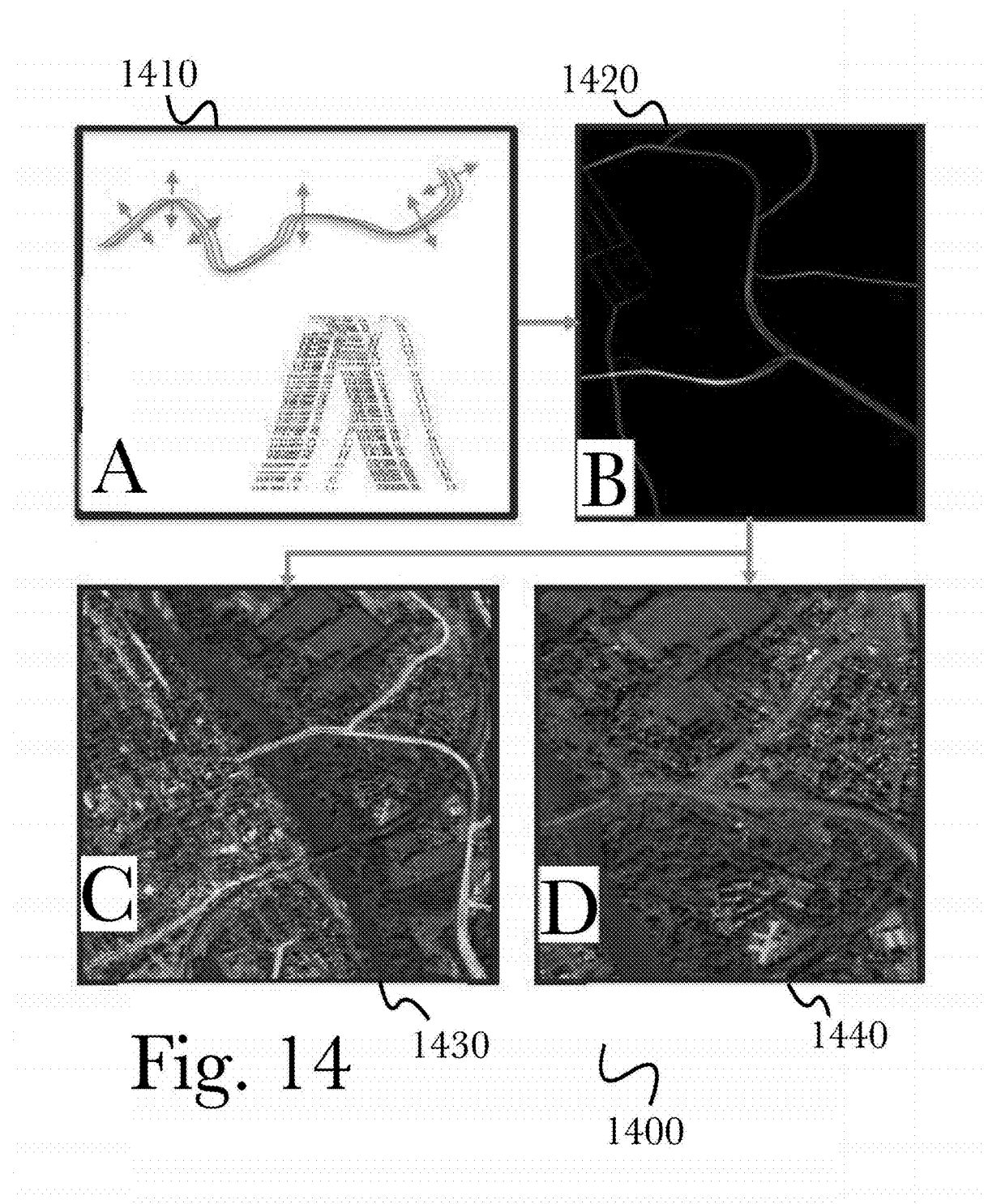
FIG. 14 shows an exemplary set of screens for a track conflation model for travel congestion and geometry extraction with no road geometry or track error, according to an embodiment of the system and method disclosed herein.

FIG. 14 shows an exemplary set of screens 1400 for a track conflation model for travel congestion and geometry extraction with no road geometry or track error, according to an exemplary embodiment of the system and method disclosed herein. Using an algorithm to resample the tracks gives the following results: In screen A 1410, the system has applied an error model with Gaussian distribution orthonormal to track points. In screen B 1420, the density of the rasterized model estimates travel frequency. Screen C 1430 shows the highest density regions vectorized. In screen D 1440, a fused version of the model produces an estimation for the road framework and the road segment geometry returned with intersection removal is applied.

In some cases, the system may collect data about tracked persons (TPs), with the data derived from a visualizing analytic software tool running on a computer. In such cases, the collected data may enable agents to track multiple TPs in space and over time, so that associations with other TPs may be detected. The same system, may in certain cases, collect data about the movement of TPs in and around certain locations. Further, these visualization tools may enable agents to discover connections between members of different online social networks. All these abilities enable the system to infer causality of actions from an analysis of chronology of events. Additionally, a subset of the collected data may be delivered in a suitable format to mobile devices in the field in near real time. In other cases, the system may discern a frequent location of a TP and therefore be able to associate that location with a non-trackable person who is known to have real-world association with the TP. Also, the system may parse the content of available posts of social media for purposes of obtaining a picture of prevalent languages, sentiments and events of interest. The system may then in some cases map the density of such prevalent items of interest on a small urban level to identify allegiances in certain areas.

In some cases, the system may incorporate geographical data into a map-related system, adding tracked objects within a specific area and analyzing their type of movement. The system may track objects visually from a tracking means in the sky, such as a drone, a satellite, a blimp, a high-altitude aircraft, or other, similar vehicle, using either high-resolution or infra-red video. It may also track objects using GPS, tower triangulation, beacon triangulation, inertia navigation or radio compass. Furthermore, the system can then analyze characteristics of the tracked object(s), such as speed and motion, to determine the nature of the objects, such as, for example, whether a car, a train, a motor bike, a motorcycle, a bicycle, or a pedestrian. Additionally, the system supports queries concerning tracks with relationship to single or multiple events, times, areas and points of interest, and features.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 15:
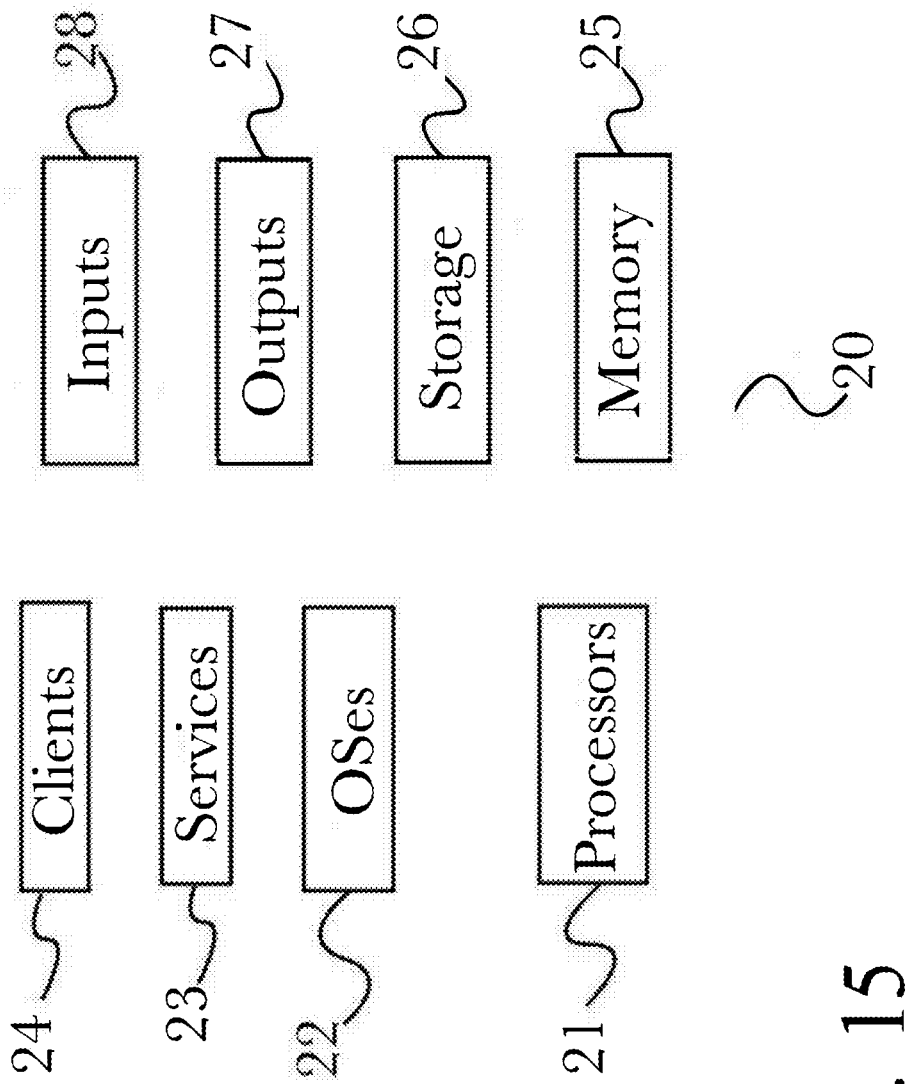
FIG. 15 is a block diagram illustrating an exemplary hardware architecture of a computing device used in an embodiment of the invention.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 15 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
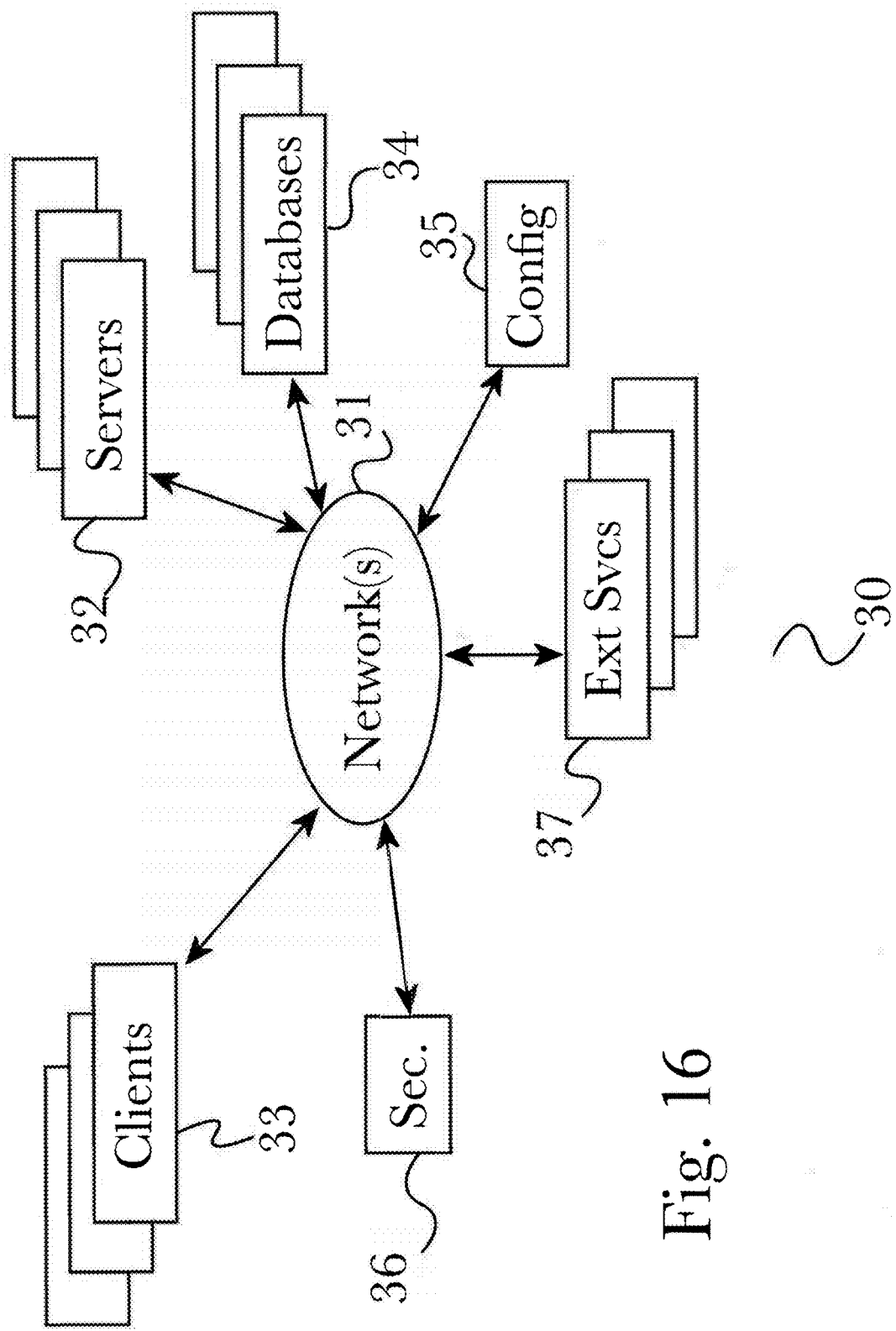
FIG. 16 is a block diagram illustrating an exemplary logical architecture for a client device, according to an embodiment of the invention.

In some embodiments, systems according to the present invention may be implemented on a standalone computing system. Referring now to FIG. 16, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
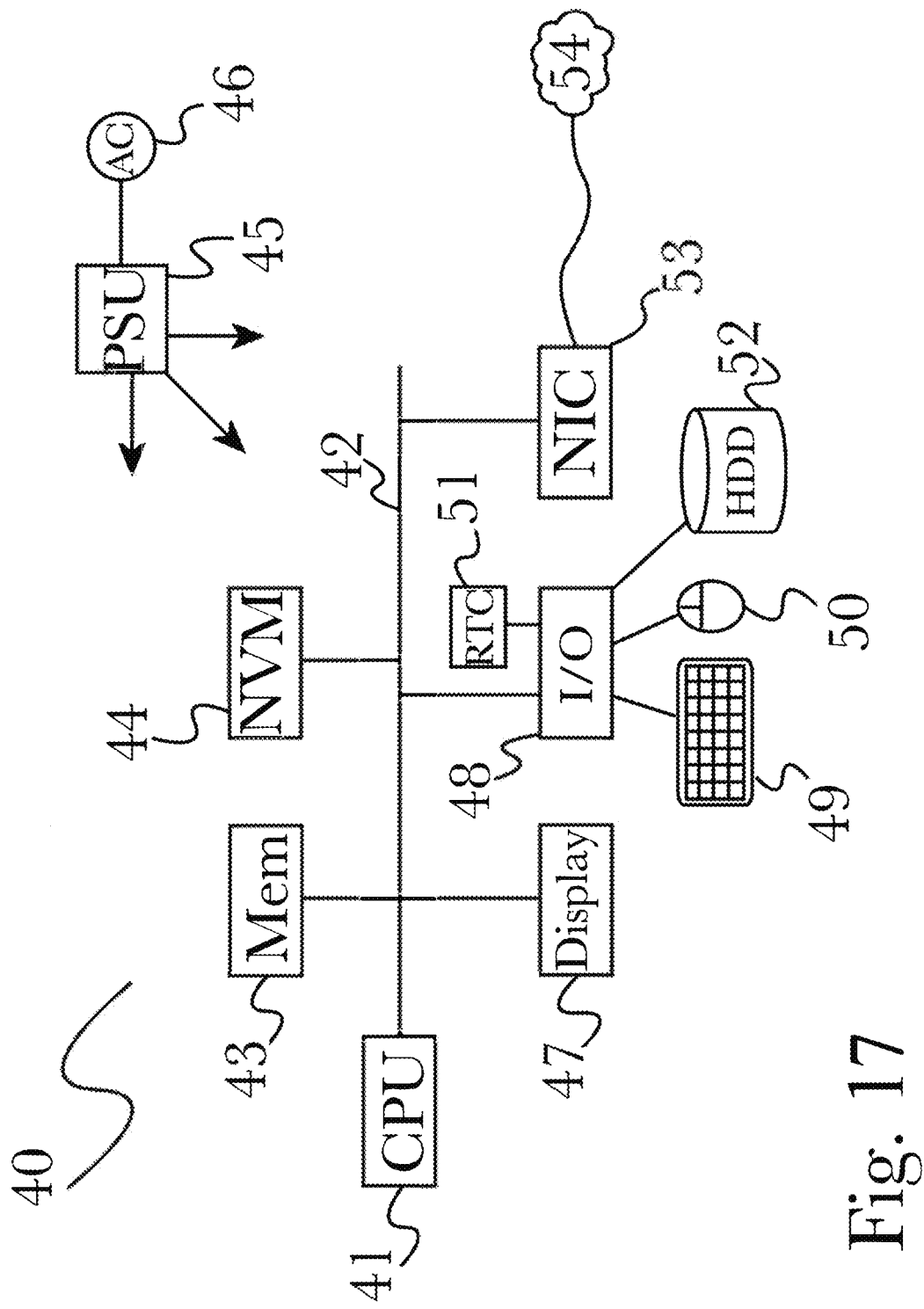
FIG. 17 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 17, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 18:
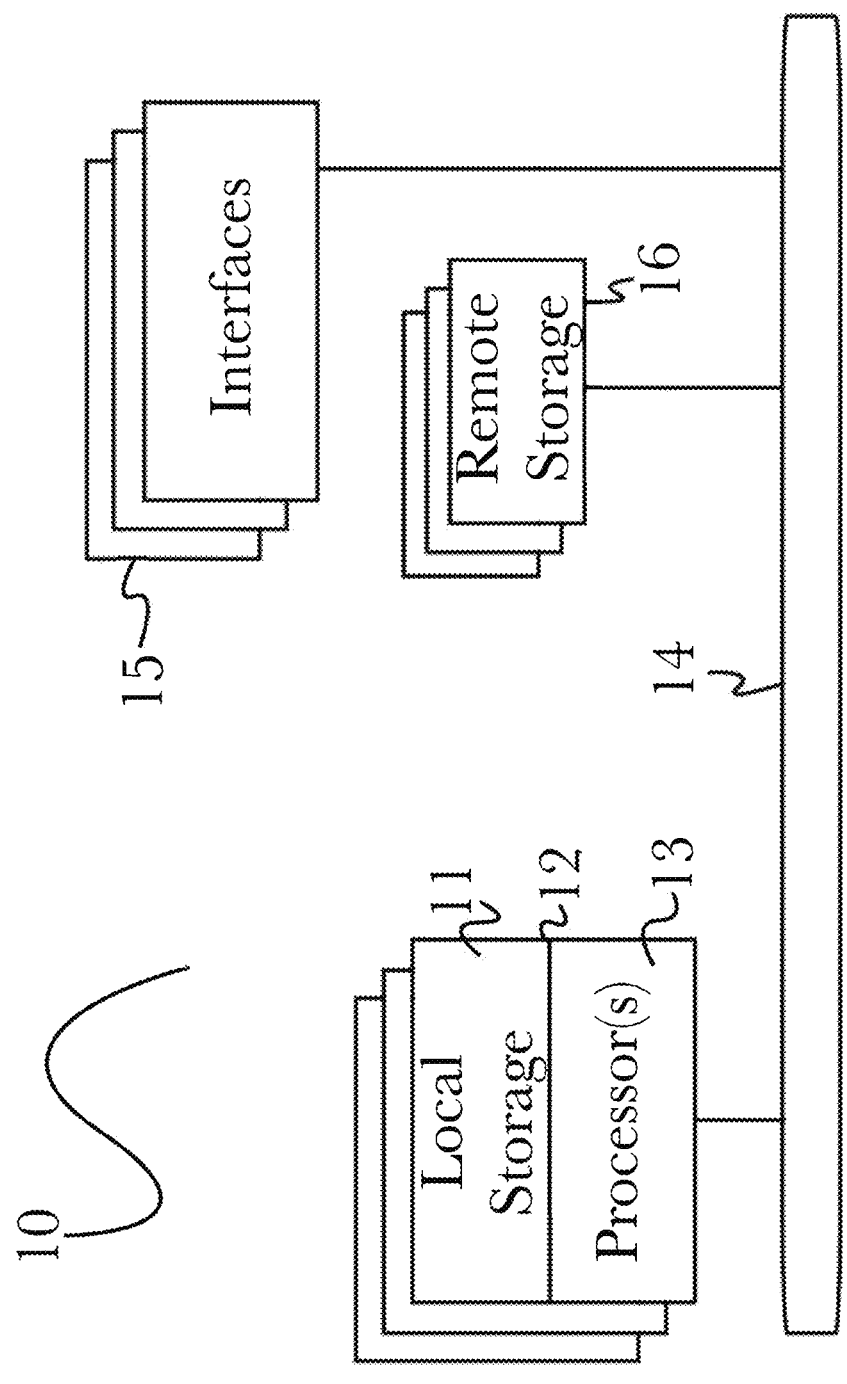
FIG. 18 is another block diagram illustrating an exemplary hardware architecture of a computing device used in various embodiments of the invention.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A method for recognizing and characterizing movement of objects on the Earth's surface using satellite imagery, comprising:
   receiving, at a geospatial analytics platform comprising a plurality of processors, a memory, and a plurality of programming instructions stored in the memory and operating on at least one of the processors, at least a set of raster data from a satellite imaging system;
   determining movement of an object on the Earth, using at least some of the programming instructions and the raster data by computing differences in each of a plurality of still satellite images extracted from the raster data;
   generating a movement layer associated with a specific satellite image of a region of interest on the Earth's surface; and
   displaying the specific satellite image with the movement layer superimposed thereupon.

2. The method of claim 1, wherein raster data is received from a raster database.

3. The method of claim 1, wherein raster data is received from a vector database.

4. The method of claim 1, wherein raster data is received from a third-party map service.

5. The method of claim 1, further comprising the step of identifying a tracked object in the movement layer.

6. The method of claim 5, wherein movement patterns of the tracked object are further analyzed to determine whether the tracked object is a vehicle.

\* \* \* \* \*